T. GALLO.
CAMERA.
APPLICATION FILED OCT. 23, 1919.
1,398,072.
Patented Nov. 22, 1921.
3 SHEETS—SHEET 1.
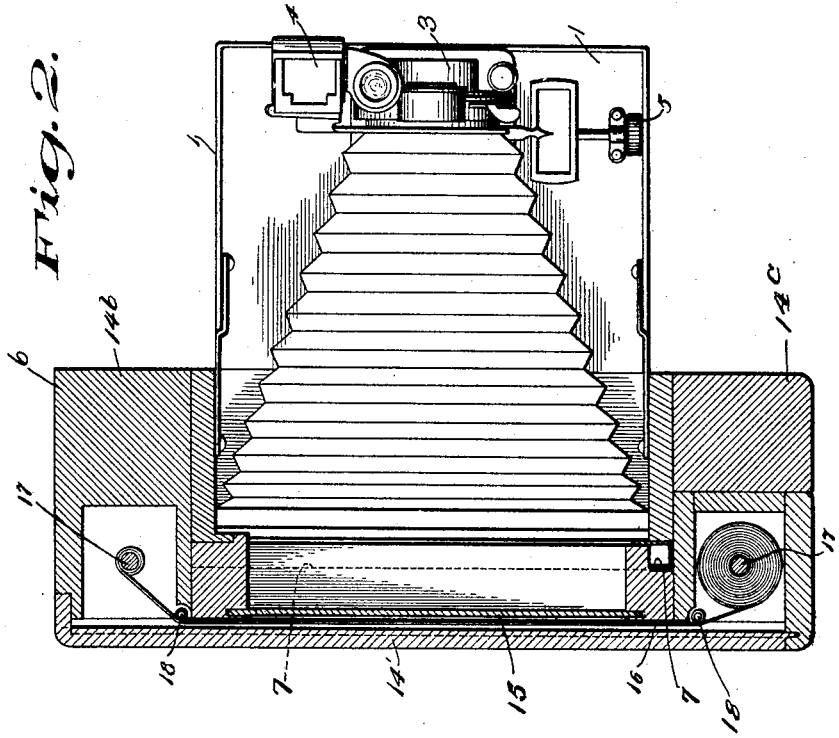
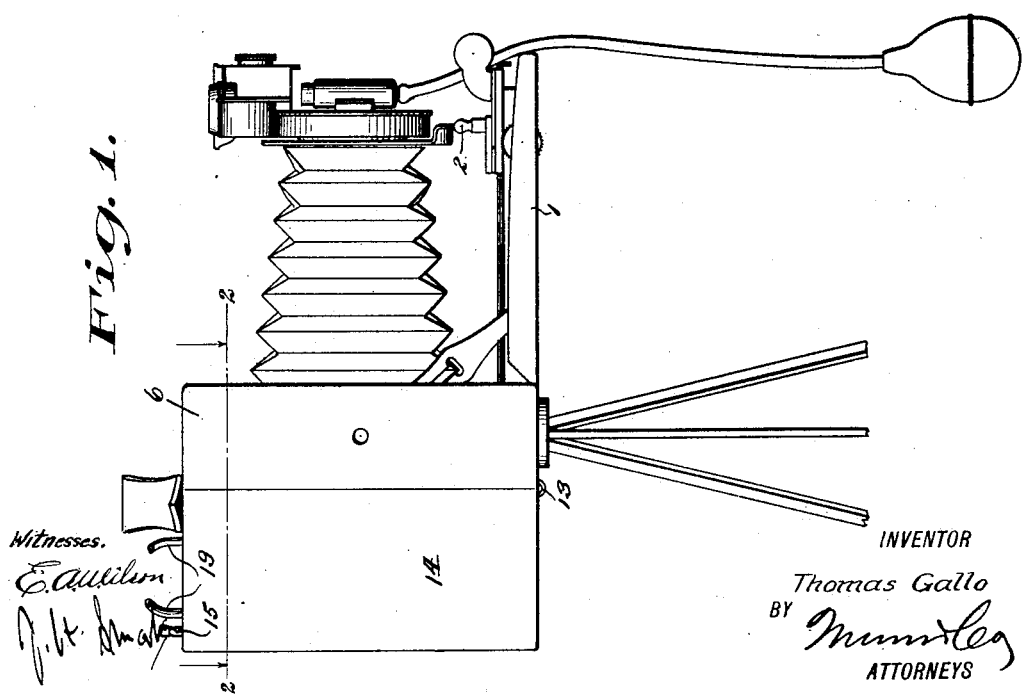
INVENTOR
Thomas Gallo
BY
ATTORNEYS

T. GALLO.
CAMERA.
APPLICATION FILED OCT. 23, 1919.

1,398,072.

Patented Nov. 22, 1921.
3 SHEETS—SHEET 2.

WITNESSES
E. A. Wilson

INVENTOR
Thomas Gallo
BY
ATTORNEYS

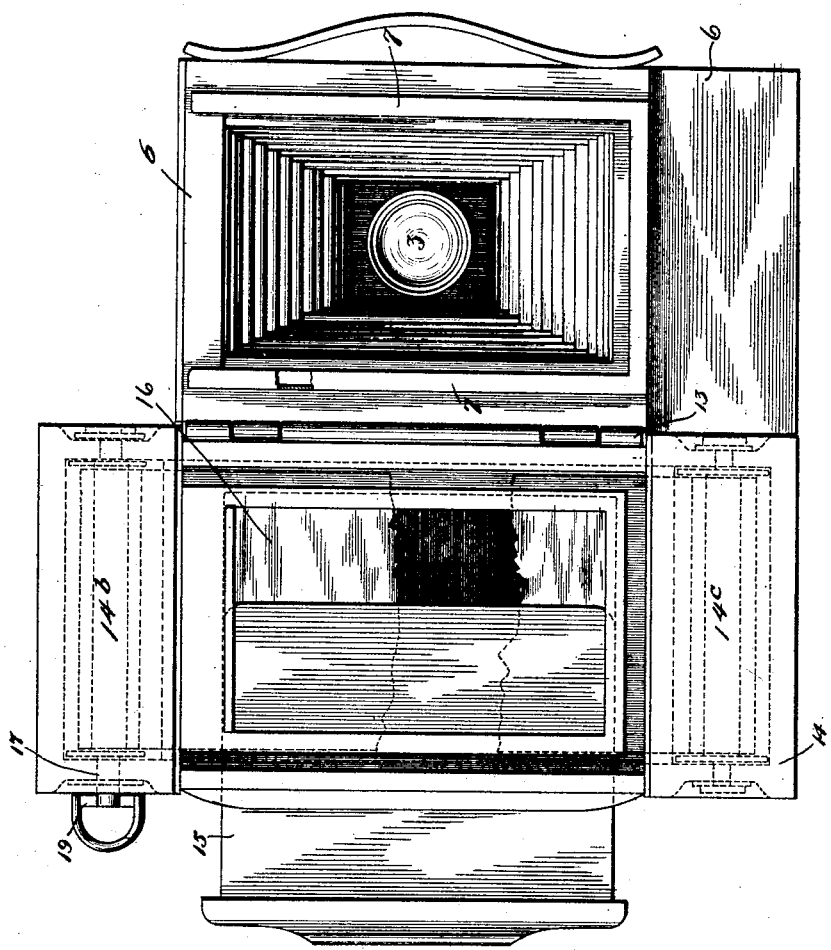

UNITED STATES PATENT OFFICE.

THOMAS GALLO, OF NEW YORK, N. Y.

CAMERA.

1,398,072. Specification of Letters Patent. Patented Nov. 22, 1921.

Application filed October 23, 1919. Serial No. 332,653.

*To all whom it may concern:*

Be it known that I, THOMAS GALLO, a citizen of the United States, and a resident of the city of New York, borough of Manhattan, in the county and State of New York, have invented a new and Improved Camera, of which the following is a full, clear, and exact description.

The usual film camera, in which the proper positioning of the lens carriage is always more or less a matter of guesswork, has, as is well known, proven unsatisfactory. In the conventional construction of this type of camera the operator has had to depend, in his focusing and the positioning of the image to be photographed upon the film, upon a "finder," employed in conjunction with a scale, indicating the approximate position to be assumed by the lens-mounting carriage to produce a correct focus at certain approximate distances, this scale usually being subdivided for this purpose into 6, 10, 15, 25, 50, and infinite feet.

Considering, primarily, the detrimental features of the finder, it is well known that it is quite likely that the same may become slightly bent, or have its mirror at an improper angle, which will result in objects appearing in the finder not being duplicated upon the sensitized film, as well as permitting objects which were to be excluded to appear upon such film. This detriment has often resulted in the spoiling of pictures which were non-duplicatable.

Referring, secondly, to the provision for focusing, it is well appreciated that this arrangement is, at best, a very makeshift sort of a proposition, in view of the fact that cameras, particularly of the cheaper type, are assembled in great numbers at the factory and it is obvious that in mass production great care cannot be exercised in the positioning of the scale upon the guideboard of a camera with such nicety that an accurate focus may at all times be relied upon. Also, it will be understood that the scales are printed with uniform spacing between their various readings. Almost every lens has slight peculiarities which will cause different positioning to produce identical results between two lenses of a similar type.

Further, it is desirable to provide a camera which shall be capable of acting upon sensitized plates as well as films, so that the necessity of employing two cameras is eliminated, it being understood that the best results are usually obtained upon plates, although a film will serve the purpose very nicely in most instances, at the same time proving far more economical than a sensitized plate.

With these points in view, I have constructed a camera which will have as one of its objects the provision of a ground plate by means of which the camera may be focused accurately, whether a film or plate is intended to be used, without resorting to the necessity of removing the film.

A further object of the invention is the construction of a camera which shall be capable of receiving both films and plates, it being at the option of the user as to which type of sensitized element is to be employed.

Other objects of the invention will appear in the following specification, the drawings of which represent one practical embodiment of my invention, and in which—

Figure 1 is a side view of a camera constructed in accordance with my invention and mounted upon a tripod;

Fig. 2 is an enlarged sectional view taken along line 2—2 of Fig. 1;

Fig. 6 illustrates the entire camera in open position with the ground plate partly broken away and the enveloping hood for the same removed.

Figure 4:
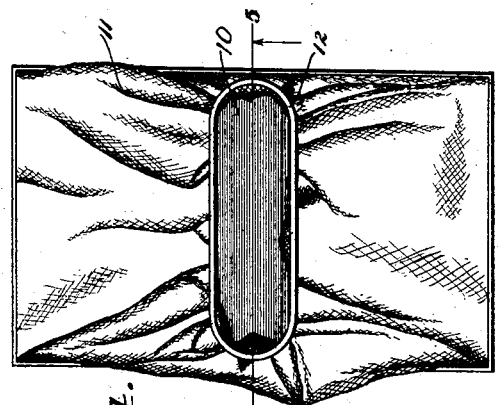
Fig. 4 is an end view of the structure associated with such ground plate.
Figure 5:
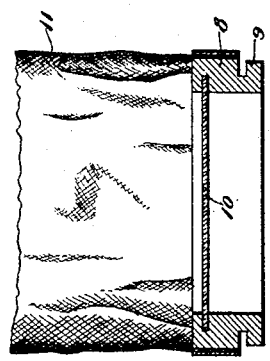
Fig. 5 is a sectional view taken along line 5—5 of Fig. 4.

In all these views like reference numerals designate similar parts, and the reference numeral 1 indicates the conventional folding face plate serving as a mounting for the tracks, upon which there is slidably positioned a carriage 2 carrying the usual lens 3 to the forward end of the bellows extending between the sensitized element and such lens.

It will be noted that the carriage has associated with it the usual construction, such as a finder 4 and a carriage mover 5, which may be of any convenient construction, such as a thumb screw, as has been indicated in the drawings.

Figure 3:
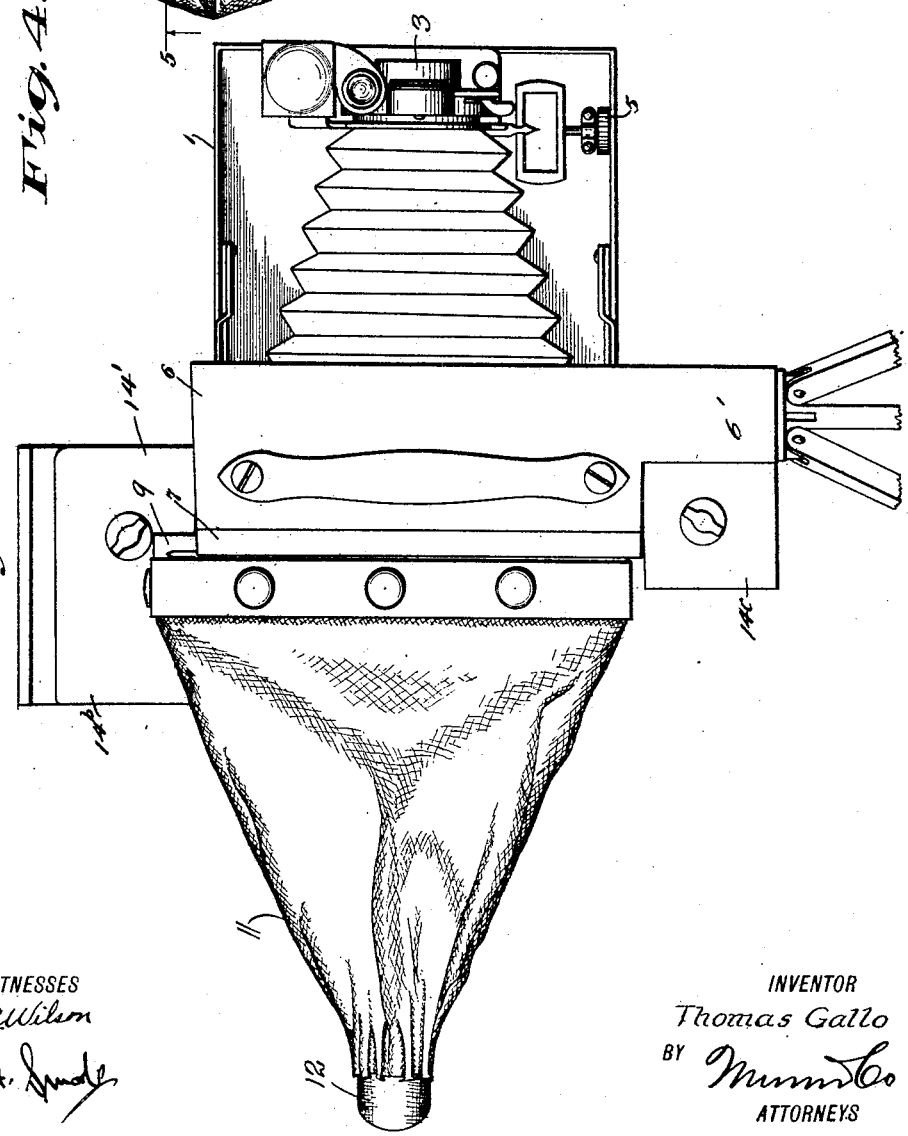
Fig. 3 is a plan view with the ground plate in position with the slide at the back of the second boxing partly withdrawn.

The housing of my camera may conveniently include a boxing 6 which has its rear end open and is provided adjacent its rear edges with grooved members 7 adapted to receive a plate or ground-glass holder, or a conventional plate holder. The boxing 6 is provided at one end with an extension 6' as shown in Figs. 3 and 6.

The ground glass is conveniently mounted in a frame, such as 8, which is provided with shoulders 9 adapted to engage in the grooves of the members 7, the glass being indicated by the reference numeral 10. A cloth 11 of dark material has its forward edges secured to the frame 8 and terminates in an oblong rear opening, in which shape it is rigidly held by any suitable means, such as the member 12.

Conveniently secured to the boxing 6, as, for instance, by means of a hinge 13, is a second boxing 14 which consists of a central portion 14$^a$ and two projecting end members 14$^b$ and 14$^c$ between which the body of the boxing 6 fits. The front face of the central portion 14$^a$ is open, the face of such opening being capable of being covered, so as to exclude light, by any suitable means, such as a slide 15 mounted in grooves associated with the inner face of the opening formed in the second boxing 14. The boxing is provided in its rear wall with a slide 14'. In this connection it will be noted that the slide 15 is spaced from the slide 14' of the boxing 14 and thus a light-sealed space is provided between such slide 15 and the slide of the boxing 14, which permits of the positioning and moving of an interposed sensitized film 16. It will be noted that this film may be of conventional construction, including a pair of spools 17 the body of the film passing over anti-friction rollers 18.

It will now be perceived that should it be desired to "load" the camera this may be accomplished by sliding the slide 14' from the boxing 14, inserting a full spool of sensitized film 17 within the boxing, drawing the forward end of the film strip across the anti-friction rollers 18, and threading the end of the same in the usual manner upon the opposite spool 17.

The slide is now returned to position in the boxing 14 and the key 19 rotated until the identifying numeral upon the paper backing strip of the film appears in front of the conventional sight opening associated with the slide 14'.

Assuming now that an object is to be photographed and the operator should desire to secure a representation of the same upon the sensitized film, it will be appreciated that this may readily be accomplished by inserting the slide 15 within the boxing 14, thus preventing any entry and consequent impression of light upon the sensitized films 16.

The boxing 14 is now swung downwardly to the position shown in Fig. 3, the hinge 13 permitting of this movement, so that the ground glass 10 with its associated frame 8 may be applied to the boxing 6 by virtue of the shoulders 9 engaging the grooves of the members 7 associated with such boxing 6. It will now be perceived that the shutter may be opened and the eyes applied to the sight opening formed by the member 12 and the correct position of the carriage 2, and, consequently, lens 3, determined. Upon the carriage being now moved slightly so that the image upon the ground glass is out of focus to a slight degree, it will be perceived that a perfect representation may be obtained upon the film 16, this latter movement being necessary by virtue of the fact that the film 16 occupies a position slightly to the rear of that of the ground-glass plate 10.

The ground glass frame having been removed, the rear boxing 14 may now be swung upwardly to the position indicated in Fig. 1, and upon the slide 15 being removed therefrom and the shutter associated with the lens 3 operated the reproduction of a perfect image upon the sensitized film 16 may be obtained.

When it is desired to utilize the camera as a plate camera, this may readily be accomplished by inserting the slide 15 into its proper slot in the boxing 14 so as to protect the film 16 and subsequently swinging such boxing downwardly away from the boxing 6. The ground-glass frame may now be associated with the boxing 6 and the focus accurately determined in the usual manner, subsequent to which the shutter associated with the lens 3 may be closed and a conventional plate holder inserted in the groove 7. Upon the protecting cover for such plate holder being removed it will be possible to open the shutter, whereby to expose the plate housed by such holder and to secure a photograph upon a sensitized plate.

It is to be understood that the peculiar construction of the ground-glass cloth 11 and the sight-opening member 12 permits of a quick positioning of the various elements so that an accurate survey of the ground glass 10 may be insured, contrary to the usual procedure which has necessitated the use of a head-enveloping cloth to exclude light from the ground-glass plate so that the representation of an object might clearly appear upon the same.

Obviously, any number of modifications might be resorted to without in the least departing from the scope of my invention.

I claim:

1. In a camera, the combination with the lens carrying portion thereof having at its rear open face guideways for the reception of a plate holder, of a frame having members for engaging the said guideways and provided with a ground glass, and with a cloth hood secured thereto and terminating in an oblong sight opening.

2. In a camera, the combination with the lens carrying portion having at its open rear face grooved members, of a frame having shoulders for engaging the grooves of the said members and provided with a ground glass, and with a cloth hood having secured in its end an oblong open frame and forming a sight opening.

3. An attachment for cameras, comprising a rectangular frame having means adapted to engage the plate holder receiving means of the camera to removably secure it thereto, a ground glass mounted in the frame, and a cloth hood secured to the frame and provided at its rear edges with an oblong open frame forming a sight opening.

4. A camera, comprising a lens carrying boxing having a rear open face and provided at the edges thereof with grooved members, a second boxing hinged to the first boxing and having a central recess to receive the first boxing, said second boxing being provided at opposite sides with chambers to receive film spools, a slide in the back of said boxing and permitting the insertion of the spools in the chambers, and a light excluding slide spaced from the first slide to permit the films to pass between the said slides.

5. A camera, comprising a lens-carrying boxing having a rear open end and provided at said end with guideways adapted to receive a plate holder, a second boxing hinged to the first boxing and having a central recess to receive the first boxing and provided at each side with a film spool chamber, a slide in the back of the boxing and closing the chambers, a light excluding slide spaced from the first slide, a frame having means for engaging the said guideways and provided with a ground glass and a cloth hood terminating in a sight opening.

THOMAS GALLO.